U

United States Patent Office 2,772,287
Patented Nov. 27, 1956

2,772,287

BASIC ESTERS OF N-ARALKYL-N-CYCLOALKYL-CARBAMIC ACIDS AND THE PRODUCTION THEREOF

John W. Cusic, Skokie, Ill., assignor, by mesne assignments, to G. D. Searle & Co., Skokie, Ill., a corporation of Delaware No Drawing. Application March 16, 1953,
Serial No. 342,731

8 Claims. (Cl. 260—326.3)

This invention relates to N-aralkylcycloalkanecarbamates, to salts thereof and to methods for their preparation. More particularly this invention relates to the compounds of the general structural formula

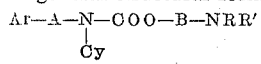

and their salts, wherein Ar is a monocycloaryl radical, Cy is a lower cycloalkyl radical, A and B are lower alkylene radicals, and NRR' is a non-aromatic amino radical. In the foregoing structural formula Ar is a monoisocyclic aryl radical, i. e. an aryl radical containing only one all-carbon ring. Within this definition fall phenyl and lower alkylated phenyl radicals such as tolyl, xylyl and cumenyl. The radical Cy is a lower cycloalkyl radical containing three to six nuclear carbon atoms. Among the cycloalkyl radicals which Cy can represent are cyclopropyl, cyclobutyl, cyclopentyl and cyclohexyl as well as lower alkylated derivatives thereof such as methylcyclopentyl, ethyl cyclohexyl and the like. The radical A is a lower alkylene radical such as ethylene, propylene, butylene, trimethylene, tetramethylene, pentamethylene and hexamethylene. The amino group NRR' represents secondary and tertiary amino radicals which are non-aromatic in character. It includes monoalkylamino radicals such as methylamino, ethylamino, propylamino, isopropylamino, butylamino, isobutylamino, secondary-butylamino, isoamylamino, hexylamino, isohexylamino, and related radicals. The radical NRR' can also represent non-aromatic heterocyclyl radicals as morpholino, piperazino and N-alkylpiperazino radicals. Of special importance are radicals wherein R and R' are combined to form a lower alkylene chain containing four to five carbon atoms in the heterocyclic nucleus formed thereby as in the case of the pyrrolidino, 2,5-dimethylpyrrolidino, piperidino and lupetidino radicals.

The organic bases of the foregoing type form salts which are non-toxic in therapeutic dosage with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, and related acids. They also form quaternary ammonium salts with a variety of organic esters of sulfuric, hydrohalic, and aromatic sulfonic acids. Among such esters are methyl chloride, ethyl chloride, propyl bromide, butyl chloride, isobutyl bromide, ethyl chloroacetate, β-bromoethyl acetate, methyl β-bromopropionate, ethylene bromohydrin, ethylene chlorohydrin, propylene bromohydrin, benzyl chloride, benzyl bromide, phenethyl bromide, naphthylmethyl chloride, dimethyl sulfate, diethyl sulfate, methyl benzenesulfonate, ethyl toluenesulfonate, propyl toluenesulfonate, propylene chlorohydrin, γ-hydroxypropyl, allyl chloride, methallyl chloride, crotyl bromide, and the like.

The compounds of this invention can be prepared by reacting two or more equivalents of an amine of the formula

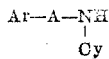

with one equivalent of a haloalkyl halocarbonate (also known as haloformate) of the formula Hal—COO—B—Hal wherein Hal is a halogen atom of atomic number greater than 9 and includes chlorine, bromine, and iodine, and wherein B is a lower alkylene radical as defined herein above. This reaction is preferably carried out at lower temperature (0–25° C.) in an inert solvent. The reaction can also be conducted in aqueous medium in the presence of caustic alkali, avoiding an excess of the amine. The resulting haloalkyl disubstituted carbamate has the formula

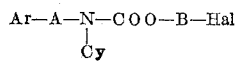

This halogenated ester is then reacted with two or more equivalents of a monoalkyl, dialkyl or saturated heterocyclic amine, generally at temperatures in the range of 50–150° C. The basic ester so formed is removed by conventional procedures and may be purified by distillation or by conversion to a crystalline salt.

The compounds of this invention may also be prepared by reacting a secondary amine of the formula

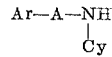

with phosgene in an inert solvent to form a disubstituted carbamyl chloride of the formula

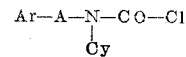

The latter is reacted with an amino alcohol of the formula

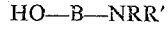

generally in an inert solvent at temperatures in the range of 25–150° C.

The compounds of this invention are valuable medicinal agents. Particularly they are potent cardiovascular agents causing a decrease in blood pressure. Their quaternary salts cause inhibition of the transmission of autonomic nerve impulses through the sympathetic and parasympathetic ganglia.

The following examples illustrate in more detail the present invention without, however, limiting it thereto. The relative quantities of materials are given in parts by weight, temperatures in degrees centigrade (°C.) and pressures in millimeters (mm.) of mercury.

Example 1

A solution of 356 parts of β-chloroethyl chlorocarbonate in 3500 parts of dry ether is added with good agitation to a solution of 885 parts of benzylcyclohexylamine in 3500 parts of dry ether at 0° C. The reaction mixture is agitated for a few hours after the addition, then filtered and the filtrate evaporated. The residue is heated with a solution of 800 parts of methyl ethyl ketone containing 400 parts of dimethylamine and 10 parts of potassium iodide at 85° C. for four days in a closed vessel. The solution is then evaporated to remove most of the solvent and the residue is taken up in cold dilute muriatic acid and agitated with ether. The aqueous layer is separated, made alkaline and extracted with ether. The ether extract is dried and evaporated. The residue of β-dimethylaminoethyl N-benzylcyclohexanecarbamate distills at 165–170° C. at 1 mm. pressure. It forms a crystalline hydrochloride melting at 164–165° C.

Example 2

10 parts of β-dimethylaminoethyl benzylcyclohexanecarbamate and 23 parts of methyl iodide are reacted in 40 parts of methyl ethyl ketone at 0° C. The crystalline precipitate of β-dimethylaminoethyl N-benzylcyclohexanecarbamate methiodide is collected on a filter, washed with ether and dried. It melts at 148–149° C. The compound has the structural formula

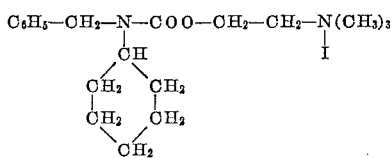

*Example 3*

A solution of 87 parts of δ-chlorobutylbenzene and 60 parts of cyclopropylamine in 400 parts of benzene is heated at reflux temperature for 3 days, cooled and filtered. The filtrate is vacuum distilled to obtain δ-cyclopropylaminobutylbenzene. 38.2 parts of this base in 180 parts of benzene are added gradually with agitation to a solution of 15.7 parts of γ-chloropropyl chlorocarbamate in 150 parts of ether at 0° C. The reaction mixture is agitated for 3 hours, cooled and filtered and the filtrate is concentrated under vacuum to yield the γ-chloropropyl N-(δ-phenylbutyl) - cyclopropanecarbamate.

33 parts of this ester, 100 parts of dimethylamine, 50 parts of methyl ethyl ketone and one part of potassium iodide are heated in a sealed vessel for two days at 75° C., concentrated and treated with ice, dilute hydrochloric acid and ether. The aqueous layer is separated, made alkaline and extracted with ether. This extract is dried and evaporated to yield the γ-dimethylaminopropyl N-(δ-phenylbutyl)-cyclopropanecarbamate, which is distilled at about 170–175° C. and 1 mm. pressure. It has the structural formula

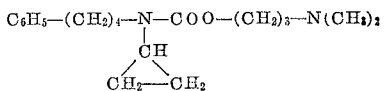

*Example 4*

A solution of 165 parts of p-isopropylbenzyl chloride and 190 parts of cyclopentylamine in 1000 parts of benzene is refluxed for three days, permitted to stand for one hour at room temperature and filtered. The filtrate is vacuum distilled to yield the N-(p-isopropylbenzyl)-cyclopentylamine.

A solution of 169 parts of the amine in 350 parts of dry ether is dropped with stirring into an ice cooled solution of 60 parts of phosgene in 400 parts of toluene and 400 parts of ether. After standing at room temperature for 12 hours, the mixture is filtered and evaporated leaving an oily residue of N-(p-isopropylbenzyl)-N-cyclopentanecarbamyl chloride.

180 parts of this residue, 65 parts of δ-dimethylaminobutanol and 250 parts of methyl ethyl ketone are refluxed for two days, chilled and treated with dilute hydrochloric acid and ether. The acidic layer is separated, made alkaline and extracted with ether. This extract is dried, filtered and evaporated to yield the δ-dimethylaminobutyl N-(p-isopropylbenzyl) - cyclopentanecarbamate which is distilled at about 200–210° C. and 2–3 mm. pressure. It has the structural formula

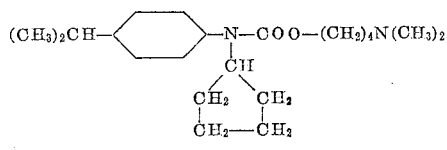

*Example 5*

A mixture of 75 parts of β-chloroethyl N-benzylcyclohexanecarbamate, 50 parts of diethylamine, two parts of potassium iodide and 80 parts of methyl ethyl ketone is heated in a sealed vessel at 80° C. for 5 days, concentrated and treated with ice, dilute hydrochloric acid and ether. The aqueous layer is removed, made alkaline and extracted with ether. This extract is dried, filtered and evaporated to yield β-diethylaminoethyl N-benzyl- cyclohexanecarbamate which is distilled at about 192–194° C. and 3 mm. pressure. Treatment of an ether solution with one equivalent of ethanolic hydrogen chloride yields a solid hydrochloride which, recrystallized from ethyl acetate, melts at 123–124° C.

*Example 6*

A mixture of 120 parts of β-diethylaminoethyl N-benzylcyclohexanecarbamate, 228 parts of methyl iodide and 400 parts of methyl ethyl ketone is stirred at 0° C. for 3 hours and then treated with ether. The initially oily precipitate solidifies on standing. Crystallized from methyl ethyl ketone, the methiodide melts at about 117–118° C. It has the structural formula

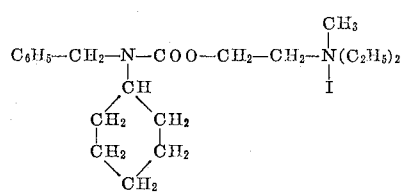

*Example 7*

A mixture of 93 parts of di-n-propylamine, 101 parts of β-chloroethyl N-benzylcyclohexanecarbamate, two parts of potassium iodide and 120 parts of methyl ethyl ketone is heated at 85° C. for 4 days in a closed vessel, concentrated and then taken up in cold dilute muriatic acid and agitated with ether. The aqueous layer is separated, made alkaline and extracted with ether. This ether extract is dried and evaporated yielding β-di-n-propylaminoethyl N-benzylcyclohexanecarbamate which distills at about 192–195° C. and 1 mm. pressure. It has the structural formula

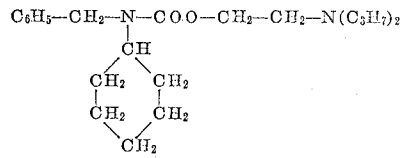

*Example 8*

A mixture of 75 parts of β-chloroethyl N-benzylcyclohexanecarbamate, 60 parts of pyrrolidine, two parts of potassium iodide and 160 parts of methyl ethyl ketone is refluxed for 40 hours, cooled and extracted with dilute hydrochloric acid. The extract is made alkaline and extracted with ether and the resulting extract is dried and evaporated to yield β-pyrrolidinoethyl N-benzylcyclohexanecarbamate which is distilled at about 206–208° C. and 3.5 mm. pressure. Treatment of an oily ether solution with ethanolic hydrogen chloride yields the hydrochloride melting at about 109–110° C.

*Example 9*

A mixture of 120 parts of β-pyrrolidinoethyl N-benzylcyclohexanecarbamate and 208 parts of methyl bromide in 400 parts of methyl ethyl ketone is heated for one hour in a sealed reactor at 80° C. and then stirred at 0° C. until a solid precipitate forms. Crystallized from methyl ethyl ketone, the methobromide melts at about 125–126° C. It has the structural formula

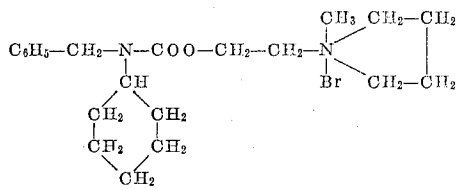

*Example 10*

A solution of 150 parts of β-pyrrolidinoethyl N-benzylcyclohexanecarbamate and 213 parts of ethyl bromide in 400 parts of methyl ethyl ketone is heated at 80° C. for 10 hours and cooled. The ethobromide is collected on a filter and crystallized from a mixture of isopropanol and ether. It melts at about 137–138° C.

*Example 11*

An ether solution of 203 parts of N-(α-phenethyl)-cyclohexylamine (prepared by refluxing 281 parts of α-phenethyl chloride and 445 parts of cyclohexylamine in 1800 parts of benzene) is added to a stirred solution of 71.5 parts of β-chloroethyl chlorocarbonate at 0° C. Benzene is added and stirring is continued for 12 hours after which the reaction mixture is filtered. The filtrate is freed from solvent by vacuum distillation.

145 parts of the β-chloroethyl N-(α-phenethyl)-cyclohexanecarbamate, 113 parts of piperidine, 4 parts of potassium iodide and 400 parts of butanone are heated in a sealed vessel for two days at 80° C., cooled and extracted with dilute hydrochloric acid. The extract is washed with ether, made alkaline and extracted with ether. This extract is dried, filtered and evaporated to yield β-piperidinoethyl N-(α-phenethyl)-cyclohexanecarbamate which is distilled at about 200–210° C. and 2 mm. pressure. It has the structural formula

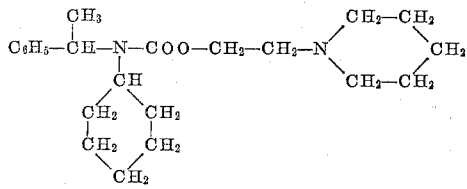

I claim:
1. A compound of the structural formula

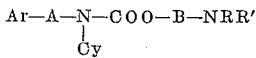

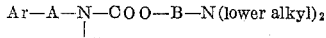
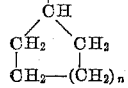

wherein Ar is a monoisocyclic aryl radical containing less than ten carbon atoms; A is a lower alkylene radical, B is a lower alkylene radical separating the oxygen and nitrogen atoms attached thereto by at least two carbon atoms; Cy is a lower cycloalkyl radical containing more than two and less than seven nuclear carbon atoms; and NRR' is a member of the class consisting of lower alkylamino radicals, lower dialkylamino radicals and radicals wherein R and R' jointly form an alkylene chain containing more than three and less than eight carbon atoms and containing more than three and less than six of these carbon atoms in the heterocyclic nucleus formed thereby.

2. A compound of the structural formula wherein Ar is a monoisocyclic aryl radical containing less than ten carbon atoms, A is a lower alkylene radical, B is a lower alkylene radical separating the oxygen and nitrogen atoms attached thereto by at least two carbon atoms and *n* is a positive integer less than three.

3. A compound of the structural formula

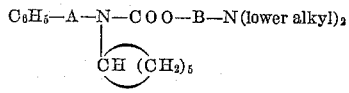

wherein A is a lower alkylene radical, and B is a lower alkylene radical separating the oxygen and nitrogen atoms attached thereto by at least two carbon atoms.

4. β - Dimethylaminoethyl N - benzylcyclohexanecarbamate.

5. β - Diethylaminoethyl N - benzylcyclohexanecarbamate.

6. A compound of the structural formula

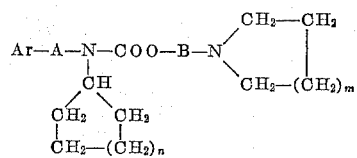

wherein Ar is a monoisocyclic aryl radical containing less than ten carbon atoms, A is a lower alkylene radical, B is a lower alkylene radical separating the oxygen and nitrogen atoms attached thereto by at least two carbon atoms and *m* and *n* are positive integers less than three.

7. A compound of the structural formula

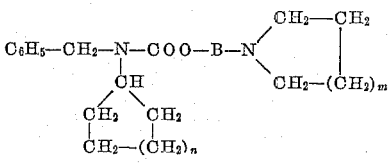

wherein B is a lower alkylene radical separating the oxygen and nitrogen atoms attached thereto by at least two carbon atoms and *m* and *n* are positive integers less than three.

8. β - Pyrrolidinoethyl N - benzylcyclohexanecarbamate.

References Cited in the file of this patent
UNITED STATES PATENTS

| | | |
|---|---|---|
| 2,408,893 | Swann et al. | Oct. 8, 1946 |
| 2,585,826 | Olsen | Feb. 12, 1952 |
| 2,642,433 | Duschinsky | June 16, 1953 |

OTHER REFERENCES

Jour. of Am. Pharm. Assoc., vol. XXXIII, pp. 193–204 (1944).